April 10, 1956        J. SMEDLEY        2,741,164
METHODS OF AND APPARATUS FOR WORKING MATERIALS
Filed Feb. 18, 1952        7 Sheets-Sheet 1

INVENTOR
JOHN SMEDLEY
By Wilkinson & Hawkinsey
ATTYS.

April 10, 1956  J. SMEDLEY  2,741,164
METHODS OF AND APPARATUS FOR WORKING MATERIALS
Filed Feb. 18, 1952  7 Sheets-Sheet 3

INVENTOR
JOHN SMEDLEY
By Wilkinson & Mawhinney
ATTYS.

United States Patent Office 2,741,164
Patented Apr. 10, 1956

2,741,164

METHODS OF AND APPARATUS FOR WORKING MATERIALS

John Smedley, Chellaston, Derby, England, assignor to Rolls-Royce Limited, Derby, England, a British company Application February 18, 1952, Serial No. 271,994

Claims priority, application Great Britain February 20, 1951

17 Claims. (Cl. 90—24.3)

This invention relates to methods of and apparatus for the working of materials and relates specifically to the forming of an edge surface, that is a marginal portion of a surface which marginal portion lies adjacent an edge defining the junction of said surface with a second surface.

According to this invention, a method of forming an edge surface comprises the steps of forming a shaving or like tool to have a cutting profile a part at least of which conforms to the profile of a transverse section of the desired edge surface, and machining the edge surface by effecting a cutting traverse of the tool lengthwise of the edge surface and during the traverse simultaneously effecting relative rocking movement of the tool and the edge surface about an axis substantially parallel to the direction of the traverse.

Preferably the axis, about which the relative rocking of the tool and the edge surface takes place, coincides substantially with the edge of the edge surface.

According to one arrangement of the invention, the edge surface on each side of an edge which is the junction between the surfaces may be machined simultaneously by one tool having cutting profile parts shaped to conform to the profile of a transverse section through the edge, the tool being arranged to straddle the edge during the machining operation.

Some edge surfaces which may be machined by the method according to the invention are such that each section taken through the edge surface at right angles to the edge is substantially symmetrical about a straight line, which will be referred to as the line of symmetry of the surface, and the point where the line of symmetry meets the edge surface will be referred to as the point of symmetry.

According to a preferred feature of the invention, the cutting profile of the tool is shaped to conform to the profile of the largest section of the edge surface taken at right angles to the edge, and the axis about which the relative rocking movement of the tool and the edge surface is effected, is arranged substantially to coincide with the locus of the points of symmetry of the edge surface.

This invention has an important application in the machining of the leading and trailing edges of blades for axial-flow compressors or turbines. Such a blade normally has its largest section adjacent its root end, i. e. the end by which it is secured to its associated part of the compressor or turbine, and the cross-section of the blade normally decreases gradually from the root to the tip. As a result the thickness of the leading and trailing edge surfaces also gradually decreases from root to tip. Furthermore such blades are often twisted about a longitudinal axis so that the line of symmetry of the tip chordal section lies at an angle to the line of symmetry of the root chordal section.

According to a feature of this invention therefore, a method of machining an edge of a blade for an axial-flow compressor or turbine comprises the steps of forming a shaving or like tool to have a cutting profile part at least of which conforms substantially to a symmetrical portion of the outline of the root chordal section at the edge, and forming the edge by effecting a cutting traverse of the tool on a blade blank in a direction lengthwise of the blade blank and simultaneously effecting relative rocking movement of the cutting tool and the blade blank about an axis which is substantially parallel to the direction of traverse and passes through the point of symmetry of the tool profile.

The relative rocking movement of the tool and the blade blank will be employed to accommodate a gradual decrease in thickness of the edge section from the root of the blade to the tip, or to accommodate the twist in the blade or to accommodate both gradual decrease in thickness and twist.

If for instance, the blade is of uniform section but has a twist, then the relative rocking movement of the tool and the blade blank will be such that as the tool moves lengthwise of the blade the angular position of the tool relative to the blade blank will be progressively changed to accommodate the twist. Thus if the lines of symmetry of the sections of the edge surface of the blade progressing from root to tip vary through the angle $\alpha$ per unit length of blade then a relative rocking through an angle $\alpha$ per unit length of traverse will be effected between the tool and the blade blank.

If, for instance, the blade has no twist and the thickness of the edge section decreases from root to tip to an extent such that the tool and the blade blank must be angularly adjusted through an angle $\beta$ per unit length of blade to enable the portion of the cutting profile of the tool to one side of its point of symmetry to sweep out the desired contour of the corresponding surface adjacent the edge, then the desired contour of the edge will be produced by a series of traverses of the tool with respect to the blade blank with relative rocking movement of the tool and the blade blank during each traverse and the extent of the relative rocking will be varied in increments from traverse to traverse from a maximum angular adjustment during the one traverse of $\beta$ per unit length of blade in one direction from the mean position and to a maximum angular adjustment during another traverse of $\beta$ per unit length of blade in the opposite direction from the mean position.

Where the blade has both twist and decreasing edge section from root to tip then the edge will again be machined in a number of traverses with the relative rocking movement of the tool and blade blank being varied in increments from traverse to traverse between limits of $\alpha+\beta$ and $\alpha-\beta$ per unit length of blade.

The machining of axial-flow compressor or turbine blades as described above can be employed with advantage after a forging operation to remove the flash of excess metal usually left on the edges of the blade blank by the forging operation.

Normally the flash will be removed by a number of successive traverses of the tool along the edge of the blade blank and in this case, in addition to the tool and blade blank being traversed lengthwise of the edge and being rocked relative to one another, the tool will be fed chordwise towards the edge in steps.

Preferably in this case the chordwise feeding occurs during the angular adjustment of the blade blank relative to the tool in one sense, and the feeding is completed, so that one edge surface of the blade blank is machined to its final shape during the traverse which occurs at the position of maximum adjustment in this sense, and the blade blank and the tool are then adjusted in the opposite sense by relative rocking so that the remainder of the blade is then machined to its final form in a number of traverses.

This invention also includes improved apparatus for working materials by the method above set forth.

According to a feature of this invention therefore, apparatus for working materials to machine an edge surface comprises a shaving, or scraping, or the like tool having a cutting profile part at least of which conforms to the profile of a transverse section of the desired edge surface, means to traverse the tool along a workpiece to effect a shaving, or scraping or the like operation, and rocking means simultaneously to effect a relative rocking movement of the workpiece and tool about an axis substantially parallel to the direction of traverse.

According to a further feature of the invention, apparatus for working materials to machine an edge of a blade for an axial-flow compressor or turbine comprises a shaving, or scraping or the like tool having a cutting profile conforming to the profile of a transverse section of the desired edge at the root of the blade, means to traverse the tool along a blade blank to effect a shaving, or scraping, or the like operation, and rocking means simultaneously to effect a relative rocking movement of the blade blank and tool about an axis which is substantially parallel to the direction of traverse. Preferably the axis about which the relative rocking movement of the tool and the blade blank takes place coincides substantially with the edge.

In one convenient construction the tool is carried in a tool holder which is supported in part-cylindrical guides formed in a traversing slide arranged for movement parallel to the axis of the part-cylindrical guides. The cutting tool is arranged in the tool holder so that the axis about which the relative angular movement with respect to the edge surface takes place, coincides with the axis of the part-cylindrical guide, and the holder is arranged for angular movement in the guide under control of suitable cam means, for instance a sine bar arrangement.

According to an important feature of this invention, in an arrangement in which the angular movement of the holder in the part-cylindrical guide is effected by cam means such as a sine bar arrangement, adjusting means is provided to control the disposition of the sine bar or the like so that the angular movement of the holder in the part-cylindrical guide may also be adjusted.

In one preferred arrangement according to this feature of the invention, the sine bar is engaged by a radius arm extending from the tool holder, and one end of the sine bar is carried by a fixed pivot and the opposite end is adjusted by a crank mechanism so that the angle of the sine bar with respect to the direction of travel of the traversing slide is adjusted. In one convenient form the crank is arranged to be indexed in timed relation to the reciprocations of the traversing slide so that the angle of the sine bar to the direction of traverse may be adjusted by increments between desired limits. The indexing of the crank mechanism may be effected through a ratchet device operated from the traversing slide. In order to adjust the limits of the angle of inclination of the sine bar to the direction of traverse, the movable end of the sine bar may be connected to the crank pin by an adjustable link.

According to yet another feature of this invention, apparatus for forming an edge surface as above set forth may include means progressively to feed the tool towards the work-piece, so that for instance if the apparatus is being employed to remove the "flash" from a forged compressor blade blank, the "flash" is not removed in one traverse of the traversing slide.

In one preferred embodiment of apparatus according to this feature of the invention the traversing slide is supported from a guide member which is pivoted at one end to a machine bed and is supported at its opposite end by taper wedge means. As the traversing slide is reciprocated the taper wedge means is displaced with respect to the guide member, preferably in a step-by-step manner through a ratchet mechanism in timed relation to the reciprocations of the traversing slide, thereby allowing the guide member to rock about its pivot and advance the traversing slide towards the workpiece. Limit stops may be provided to prevent rocking of the guide member beyond a desired position.

When the feeding is effected during angular adjustment of the tool holder in one sense, and it is desired to machine the blade to its final form in a number of traverses between which the tool holder is adjusted in the opposite sense without feeding of the tool relative to the blade occurring, a suitable lost-motion linkage may be provided between the ratchet mechanism and the taper wedge means.

Some construction of apparatus of this invention for carrying out the method of this invention will now be described as applied to machining the leading edges of axial-flow compressor blades to remove therefrom the metal "flash" formed during forging of the blade blank. The description refers to the accompanying drawings in which:

Figure 6 is a section on the line 6—6 of Figure 3, Figure 7 is a detail view.

Figure 1:
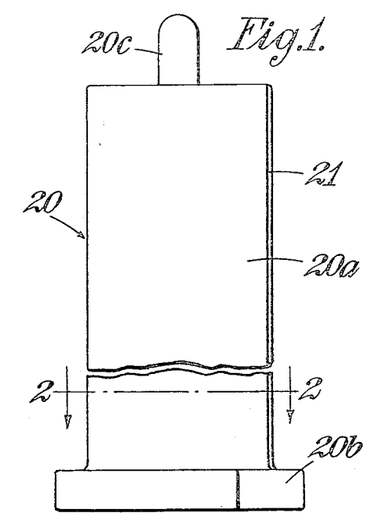
Figure 1 is an elevation of a blade blank.

Referring to the drawings (Figures 1 and 2) the forged blade blank 20 has a portion 20a which in the finished article is the operative portion of the blade, a block-like portion 20b which is subsequently machined to form the blade root attachment, a tab 20c which is subsequently machined away, and a ' 'flash" 21 along the leading edge of the portion 20a. The leading edge at each chordal section may be represented by a circular arc, the mid point of which is thus the point of symmetry, and the locus of which point defines the "edge" between the concave and convex surfaces of the blade. Referring now to Figures 3 to 11, a machine for removing the flash 21 comprises a table 22 whereon the blade blank 20 is mounted in a suitable work- holder 25, and a tool 23 and tool holder 24, and tool-moving means arranged so as to operate on the leading edge of the blade blank supported in the work-holder 25.

The work-holder 25 comprises (Figures 8 and 9) a vise having a pair of vise jaws 26, 27 shaped respectively to conform to the shape of the convex and concave surfaces of the portion 20a of the blade blank, spring means 28 urging the vise jaws 26, 27 apart and a pair of taper wedges 29, 30, one for each vise jaw. The taper wedges 29, 30 co-operate respectively with an inclined surface 26a, 27a on its associated vise jaw 26, or 27 and the former are connected by tails 29b, 30b to a pivoted lever 31. The wedges 29, 30 are so connected to the lever 31 that when the lever is rocked, for example by a handle 31a thereon, the wedges 29, 30 are moved in opposite directions thereby moving the vise jaws 26, 27 in opposite directions; it will thus be appreciated that the inclinations of the wedges 29, 30 are oppositely disposed.

Figures 6, 7, 9:
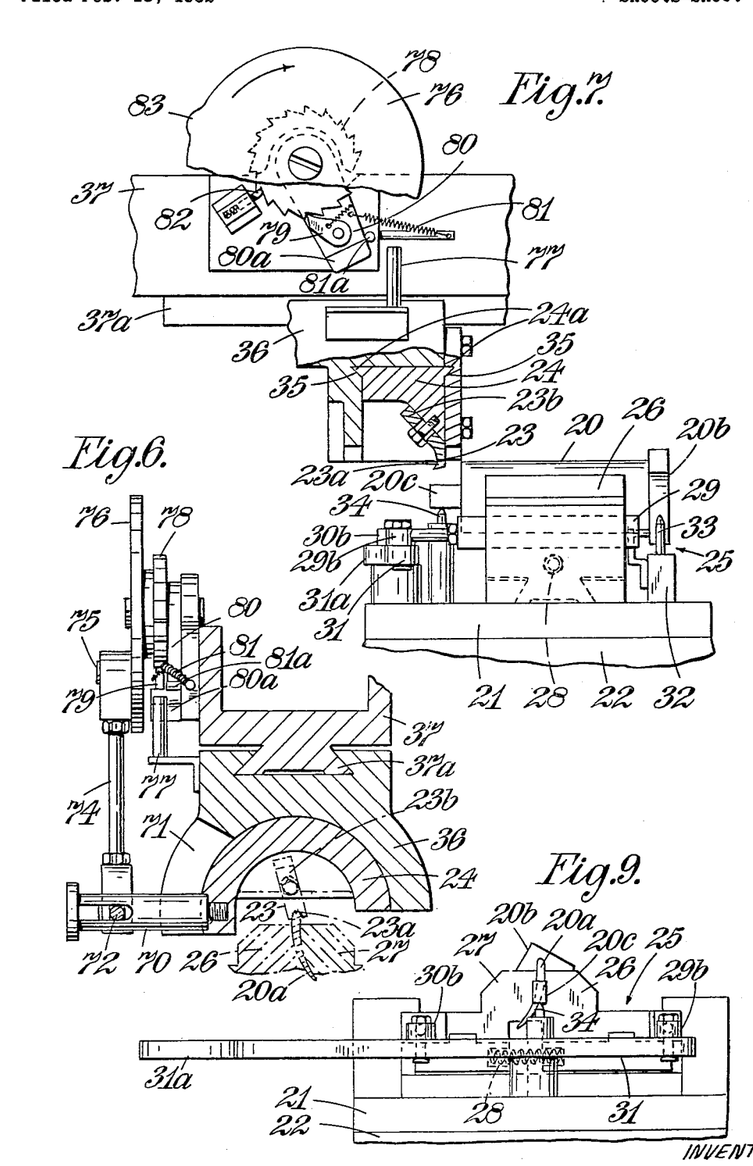
Figures 8, 10, 11, 15, 17:
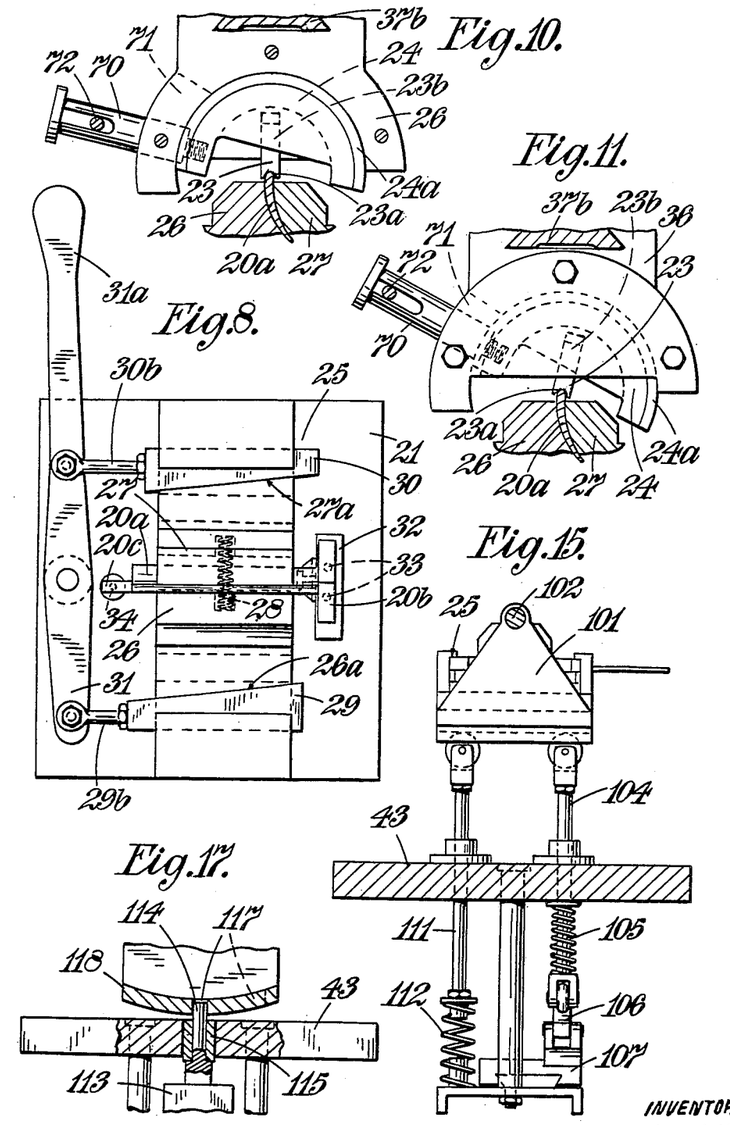
Figure 8 is a plan and Figure 9 a side elevation of the work-holding means.
Figures 10 and 11 show details of the tool holder with the tool in different positions as compared with Figure 6, Figures 12A, 12B and 13 are diagrams to an enlarged scale illustrating the method of this invention.
Figure 15 is a section on the line 15—15 of Figure 14.
Figure 17 is a section on line 17—17 of Figure 16.

The work-holder 25 also comprises locating elements for the blade blank 20 and the locating elements comprise a member 32 in which are located two dowel pins 33 to co-operate with the block-like portion 20b of the blade blank and a locating pin 34 to engage with the tab 20c.

Figure 2:
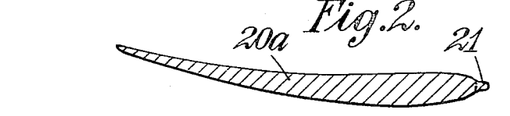
Figure 2 is a section on the line 2—2 of Figure 1.

With a blade blank 20 located between the vise jaws 26, 27 and resting on the dowel pins 33 and locating pin 34 the leading edge is properly positioned in relation to the cutting tool 23 to have the "flash" 21 on the leading edge removed and the desired contour indicated in chain lines in Figure 2 given to the leading edge. In this position of the blade blank 20 the leading edge is substantially horizontal and the tool 23 is arranged to be traversed along the leading edge.

The tool is a shaving tool having its cutting profile 23a shaped to conform to the shape of the desired leading edge at the root end of the blade, which is the part of the leading edge having the largest section.

The tool 23 has a shank 23b by which it is clamped to the tool holder 24 (Figures 6, 7, 10, 11) which is mounted by guide portions 24a in part-cylindrical guides 35 cut in traversing slide 36 and the tool 23 is adjusted in the tool holder 24 so that the axis of the part-cylindrical guides 35 extends substantially at right angles to the plane of the cutting profile 23a of the tool and through the point of symmetry of the cutting profile 23a of the tool.

The traversing slide 36 is supported from a guide member 37 on dovetail guides 37a to move along the guide member 37 in a direction parallel to the axis of the part-cylindrical guides 35, and thus substantially parallel to the leading edge of a blank 20 and the guide member 37 is supported from standards 38, 39 arranged respectively beyond each end of the work-holder 25.

Means (Figures 3 and 4) is provided to reciprocate the traversing slide 36 on the guide member 37. The reciprocating means comprises an electric motor (not shown) driving through spindle 40 a crank wheel 41 having a crank pin 42 engaging a slotted link 44 which is pivoted at one end to the base table 43 of the machine and is connected by a connecting rod 45 to the traversing slide 36. The crank pin 42 and slotted link 44 are so arranged that the rate of travel of the slide 36 in one direction, the working direction, is substantially slower than in the opposite direction, the idle direction. The spindle 40 is supported in a bracket 46 on the base table 43.

In order that the traversing slide 36 may partake of an idle stroke with the tool 23 clear of the blank 20, the following mechanism (Figures 3 to 7) is conveniently provided. The guide member 37 supporting the traversing slide 36 is supported at one end by a pivot pin 47 journalled in bosses 38a at the upper ends of the standards 38 provided beyond one end of the work-holder 25, and is supported at its opposite end on a bridge piece 48 secured on the standards 39 located beyond the opposite end of the work-holder 25 through compression spring 49 which is located between the bridge piece 48 and the free end of the guide member 37.

The free end of the guide member 37 is urged away from the bridge piece 48 by the spring 49 and is displaced towards the bridge piece 48 during the working stroke by a pair of cam plates 50 which engage the upper surface of the guide member 37 and which are rocked against the pull of a pair of tension springs 51 by a connecting rod 52 operated by a rocker arm 53 carrying a cam follower 54 engaging a cam 55 rotating with the crank wheel 41. During the working stroke the cam plates 50 hold the guide member 37 lowered and it is arranged that at the end of the working stroke of the traversing slide 36, the cam plates 50 are rocked by the cam 55 against springs 50 to allow the free end of the guide member 37 to be lifted by the compression spring 49 to carry the tool 23 clear of the blade blank 20. The cam plates 50 are pivoted by a pin 57 to the upper end of a post 56 secured to the bridge piece 48 and extending upwards through the guide member 37.

A sliding taper wedge mechanism (Figures 3 to 5) is provided to limit the extent to which the guide member 37 is depressed by the cam plates 50 and is also arranged to permit the gradual feeding of the tool 23 towards the workpiece so that the whole of the "flash" is not removed in one working stroke of the traversing slide 36. The mechanism comprises a sliding wedge 58 which co-operates with and slides between an inclined surface on block 59 secured on the free end of the guide member 37 and a horizontal slide-way 60, and the mechanism also comprises a bell crank lever 61 pivoted on a pin 62 upstanding from the bridge piece 48, one arm of the bell crank 61 having a pin and slot connection with an extension 58a of the sliding wedge 58. The other arm of the bell crank lever 61 is pivotally connected to one end of a rod 64 which at its other end has a slot 64a connecting with a pin 65a on the ratchet wheel 65 of a ratchet mechanism which is indexed by a striker pin 63 carried on the traversing slide 36.

Figure 3:
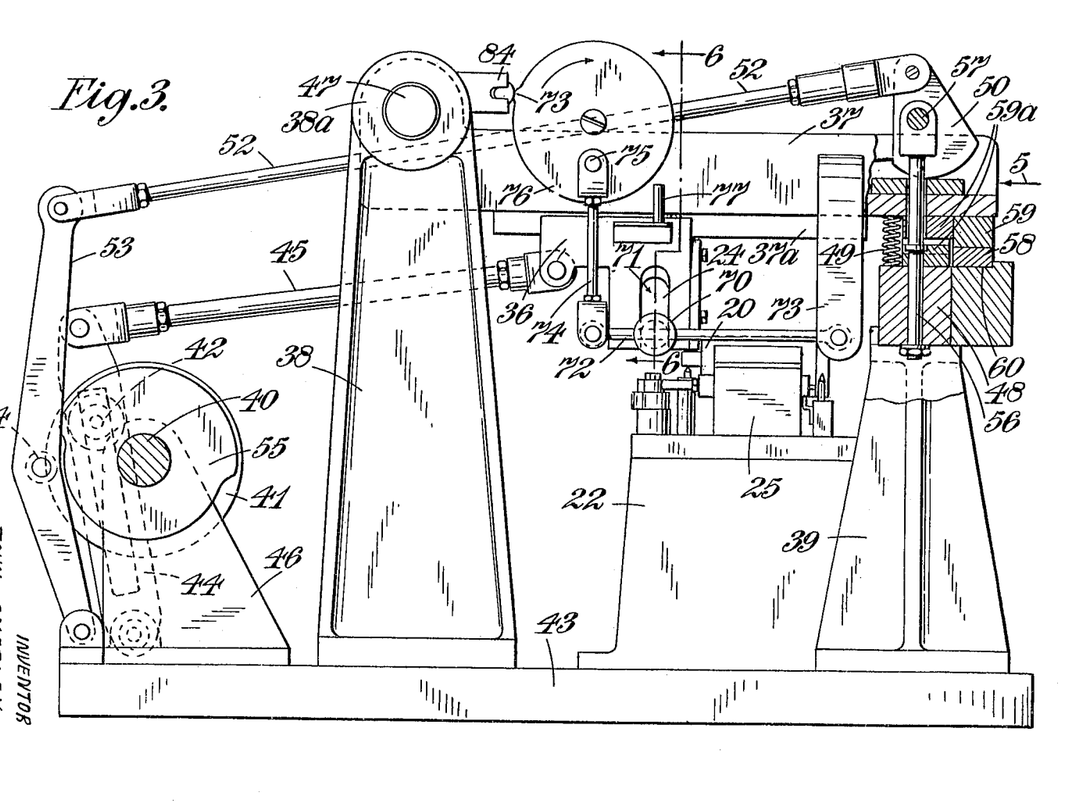
Figure 3 is a side elevation of one construction of apparatus.
Figure 4:
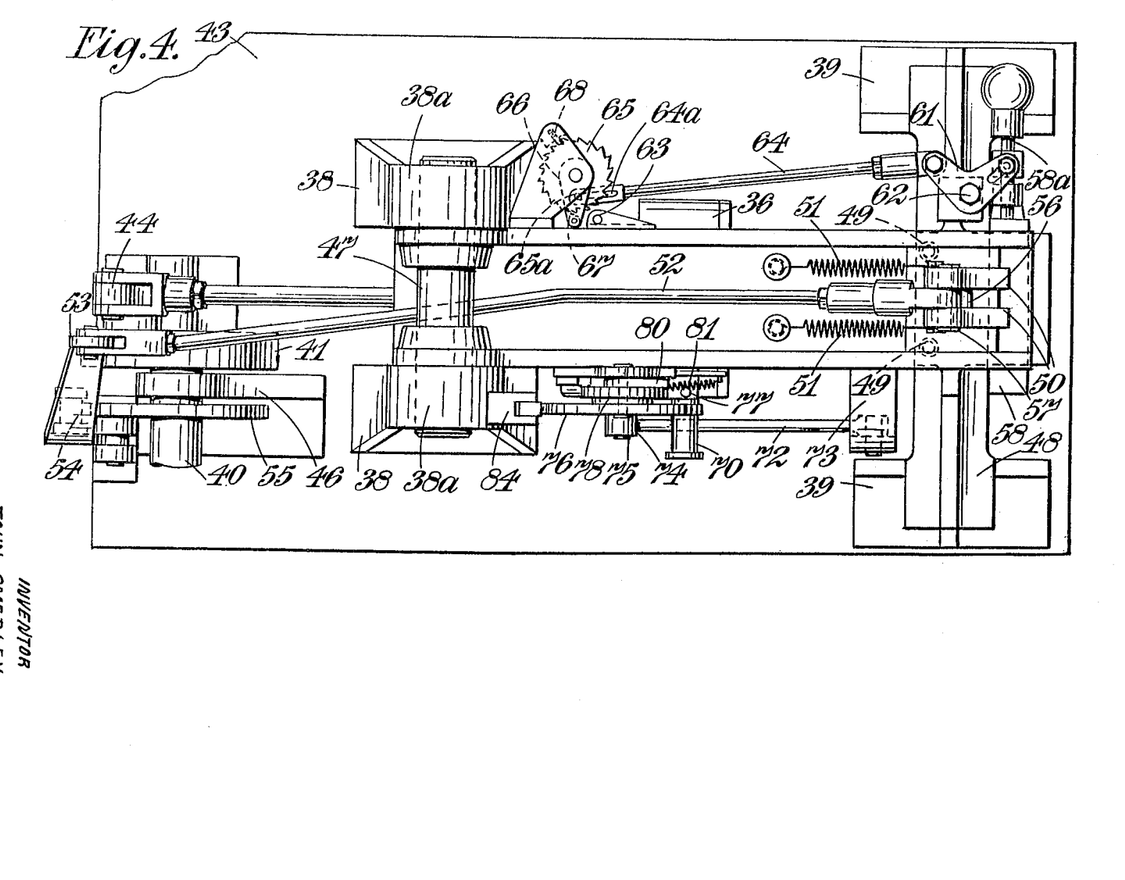
Figure 4 is a plan of Figure 3.
Figure 5:
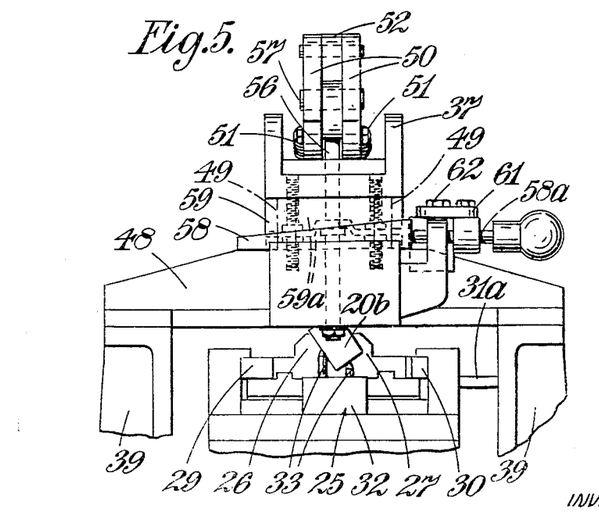
Figure 5 is a part elevation in the direction of arrow 5 in Figure 3 and shows some details of the construction.

The arrangement is that on reciprocation of the traversing slide 36 the ratchet wheel 65 is indexed step-by-step, thus rocking the bell crank lever 61 step-by-step and gradually withdrawing the sliding wedge 58 from between the block 59 and slideway 60 so lowering the free end of the guide member 37 and allowing the tool 23 to move down towards the blade blank. Co-operating stops 59a prevent the guide member moving too far towards the blade blank 20.

The ratchet mechanism (Figure 4) comprises a spring-loaded carrier 66 pivoted about the ratchet wheel axis and carrying a striker pawl 67 engaged with the ratchet wheel 65, and comprises also a spring-loaded rebound catch 68. The carrier is struck and rocked by the pin 63 on each reciprocation of the traversing slide 36 so that pawl 67 moves the ratchet wheel 65 one step. On return of the carrier 66 under the action of its spring load the rebound catch 68 prevents reverse rotation of the ratchet wheel 65.

It is arranged that when the wedge 58 is fully withdrawn so that the tool 23 has been lowered to its fullest extent on to the blank 20 the striker pawl 67 has been rotated to such a position that further rotation of the ratchet wheel 65 allows the pin 65a to slide freely along the slot 64a in the rod 64. The sliding wedge 58 thus remains stationary until it is manually returned to its initial position.

As stated above, the tool holder 24 is arranged in part-cylindrical guides 35 and it is arranged that during traverse of the tool 23 in the working direction the tool holder 24 is rotated in the part-cylindrical guides 35 and thus the tool 23 and the blade blank 20 adjusted angularly relatively to one another about an axis which is substantially at right angles to the plane of the cutting profile of the tool 23 and passes through the point of symmetry of the cutting profile of the tool. The relative movement is illustrated in Figures 6, 10 and 11.

The rotation of the tool holder 24 in the part-cylindrical guides 35 is effected in the following manner. A radius arm 70 on the tool holder 24 projects through a slot 71 in the traversing slide 37 and engages by a forked end with a sine bar 72 which in effect acts as a cam to rotate the tool holder. The angle of inclination of the sine bar with respect to the direction of travel of the traversing slide 36 is adjustable so that both the initial angular position of the tool holder 24 at the beginning of a working stroke, and also the extent to which the tool holder 24 is rotated in the part-circular guides 35 during a working stroke, may be varied. For this purpose the sine bar 72 (Figure 3) is pivoted at one end to a bracket 73 mounted on the guide member 37 and is connected at its opposite end by an adjustable link 74 to a crank pin 75 carried by a crank wheel 76 rotatably mounted on the guide member. As the crank wheel 76 rotates so the end of the sine bar 72 which is connected to the link 74, is raised or lowered, rocking the sine bar 72 about its pivot in the bracket 73 and thus increasing or decreasing the extent to which the sine bar 72 is inclined to the direction of travel of the traversing slide 36. It will be appreciated that when the sine bar 72 is parallel to the direction of travel of the traversing slide 36, the tool holder 24 will not be rotated in the part-circular guides 35 and that the greater the extent to which the sine bar 72 is inclined to the direction of travel of the traversing slide 36, the greater is the extent to which the tool holder 24 is rotated in the part-circular guides 35.

The crank wheel 76 is arranged to be indexed thereby effecting a step-by-step change, in alternation with the working strokes of the traversing slide 36, of the angular position of the tool holder 24 during the working stroke. It may be arranged that the tool holder moves from one limiting angular position in steps to the other limiting position, and back to its original position, during one revolution of the crank wheel 76. For this purpose there is provided a second ratchet mechanism (Figure 7) operated by a second striker pin 77 on the traversing slide 36 and each time the traversing slide makes a working stroke the ratchet wheel 78 of the ratchet mechanism is advanced one notch and the crank wheel 76 is rotated one step.

The wheel 78 rotates with the crankwheel 76 and is rotated by a pawl 79 which is carried on a pivoted carrier 80 having a part 80a in the path of pin 77. The carrier 80 is loaded by a spring 81 and reverse rotation of the ratchet wheel 78 is prevented by rebound catch 82. A stop 81a limits the motion of carrier 80 under the influence of spring 81.

The crank wheel 76 incorporates a cam 83 for operating a shut-off switch 84 for stopping the machine at the end of the working operation.

In use of the machine above described, after setting up a blade blank 20 in the work-holder 25 and the appropriately shaped tool 23 in the tool holder 24, the length of the adjustable link 74 is set to give the desired initial angle of the sine bar which determines the initial angular position of the tool 23 and also determines, together with the position of pin 75 on wheel 76, the angular adjustment of the tool on each working stroke. The sliding wedge 58 is then displaced to lift the guide member 37 and thus the tool 23. The machine is then started and the tool 23 reciprocates; during each cutting stroke the tool 23 is rotated about the axis of the part-cylindrical guides 35 through an angle the extent of which is changed in increments and the tool 23 is rotated in the reverse direction on the idle stroke. The angle is determined by the position of the crank pin 75 of the sine bar mechanism. On the idle stroke the tool does not return to the same angular position since the crank wheel 76 is indexed round one step between cutting strokes. The initial position of the tool before each cutting stroke is thus also changed in increments in accordance with the position of the sine bar.

Figure 12A:
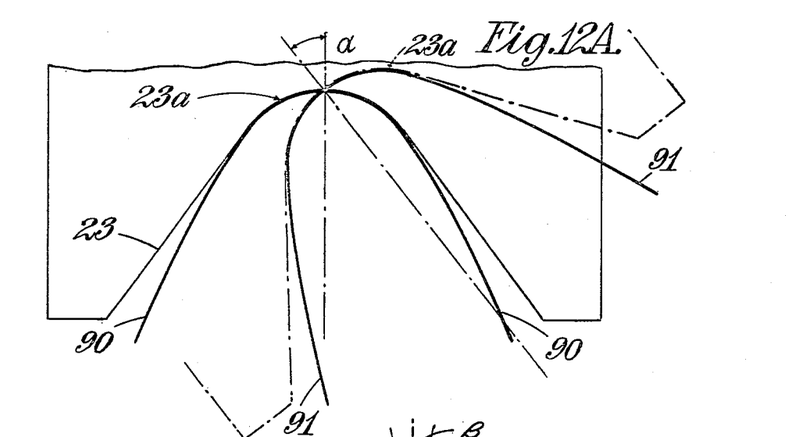

Taking the length of a blade 20a as a unit length, then if the blade has a twist of angle $\alpha$ along its length and has a uniform section, the sine bar 72 will be required to rotate the tool relative to the workpiece through an angle $\alpha$ on each working stroke and the indexing mechanism for the crank would be rendered inoperative. Thus referring to Figure 12A at the left, 90 represents the blade section at the root and 91 the blade section at the tip; these sections are at an angle $\alpha$ and clearly in moving a tool 23 along the blade edge the tool is adjusted through the same angle.

If the blade has no twist but decreases in thickness as indicated by the root and tip sections 92, 93 (Figure 12B) then the sine bar 72 is adjusted by steps between a position in which the tool 23 is given a rotation of $+\beta$, relative to the blade blank, during a cutting stroke and a position in which the tool is given a rotation of $-\beta$ during a cutting stroke; that is to say, the sine bar 72 is moved by crank wheel 76 between two limiting positions which make an equal angle with, but are on opposite sides of its mean position, the latter being parallel with the direction of movement of the tool holder in its guides.

Figure 12B:
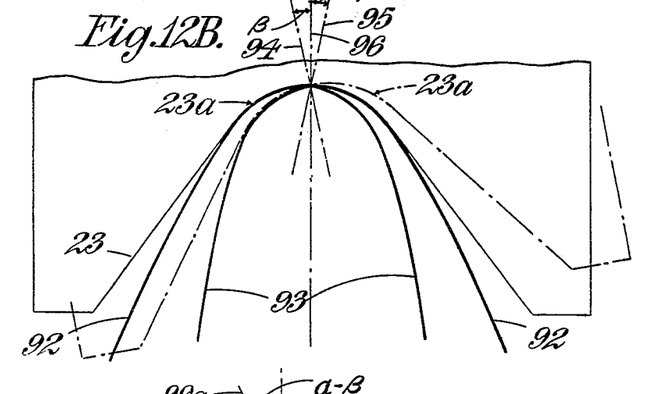

Thus, in one limiting position half the cutting profile 23a of the tool 23 is engaged with one edge surface 92 at the root end of the blade and is rotated during the cutting stroke so that it sweeps out the contour of the surface to give the appropriate contour 93 at the tip, and at the other limiting position the other half of the cutting profile of the tool sweeps out the other edge surface. Lines 94, 95, 96 represent the line of symmetry of the cutting tool in the two limiting positions and the mean position respectively.

Figure 13:
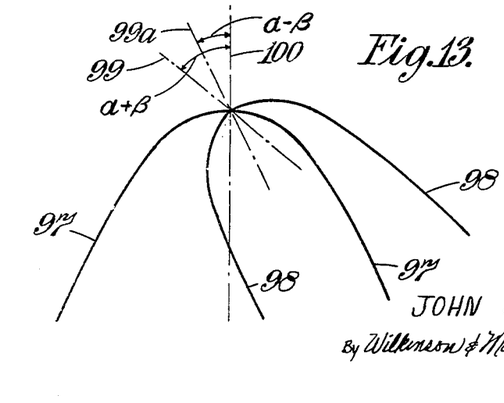

If, as is more usual, the blade both tapers in thickness and has a twist (Figure 13) in which 97 and 98 are the root and tip sections respectively, then the sine bar 72 will be adjusted by steps during machining between two limiting positions, in one of which the angular adjustment of the tool 23 by rotation of the tool holder 24 in the part-cylindrical guides 35 during the working stroke is represented by $\alpha+\beta$, and in the other of which the adjustment during a working stroke is represented by $\alpha-\beta$, as indicated by the positions 99, 100 of the line of symmetry of the cutting profile 23. The mean position of the line of symmetry is indicated at 101.

It is of course possible to arrange that the machine above described produces other relative displacements of the blade blank 20 and tool 23 during a working stroke. For instance the work-holder 25 may be arranged to be displaced on the table 22 during the working stroke in a direction transverse to the direction of travel of the traversing slide 36. Such a movement may be desirable where the axes of symmetry of the leading edge sections at the root and tip, when viewed in a direction of the spanwise axis of the blade, appear to intersect beyond the leading edge.

The relative angular movement of the tool and the edge during traverse of the tool may be accomplished by further mechanism either alternative to or additional to the above described sine bar and crank mechanism. Thus referring to Figures 14 to 17, the blade blank 20 and its holder 25 may be mounted on a rockable table 101 supported by pivots 102 engaged in pillars 103 so as to pivot about an axis passing substantially through the point of symmetry of the root and tip sections of the edge of the blade blank 20 which is to be worked. This axis coincides substantially with the axis about which the tool holder 24 is rocked in the above described sine bar and crank ararngement when the tool 23 has been fed to its fullest extent on to the blade blank by withdrawal of the sliding taper wedge 58. The means (Figures 14, 15) for rocking the table 101 may comprise a first plunger 104 sliding in the base table 43 against spring 105 and bearing on the undersurface of the table 101 to one side of the vertical plane through the rocking axis of the table 101, and bearing also on the inclined surface of a ramp 106 arranged on a carriage 107 to be reciprocated simultaneously with the traversing slide through connecting rod 108, rocker 109 and crank wheel 110 which is conveniently driven with wheel 41. A second plunger 111 slidingly engaged in the base 43 is loaded by a compression spring 112 located between the machine bed and one end of the plunger to urge the rockable table 101 into engagement with plunger 104. The plunger 111 engages the table on the side of the vertical plane through the rocking axis opposite the plunger 104. As the traversing slide 36 carries the tool 23 over the edge which is being machined the plunger 104 will ride up the inclined surface of the ramp 106 to rock the table in one direction (thus effecting relative angular movement between the tool 23 and the edge of the blade blank) and on the idle stroke the spring 112 operates through plunger 111 to rock the table in the reverse direction. Means may be provided to vary the angle of inclination of the ramp 106.

Figure 14:
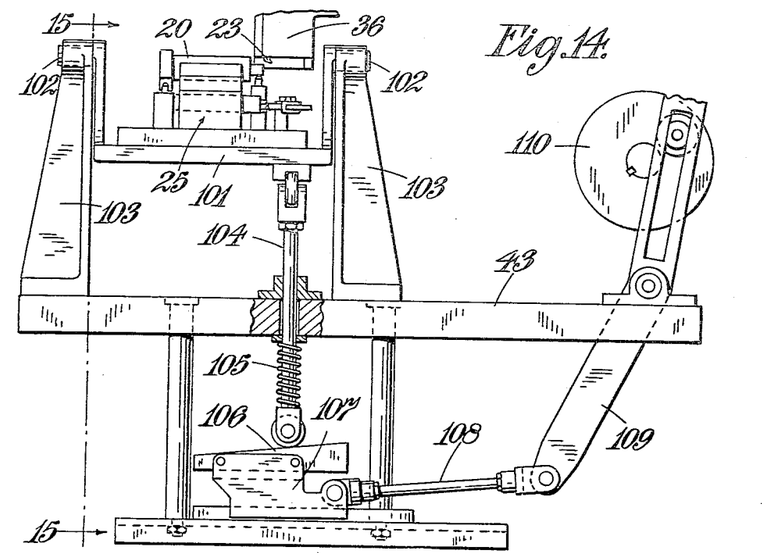
Figure 14 is an elevational view of a modified construction.
Figure 16:
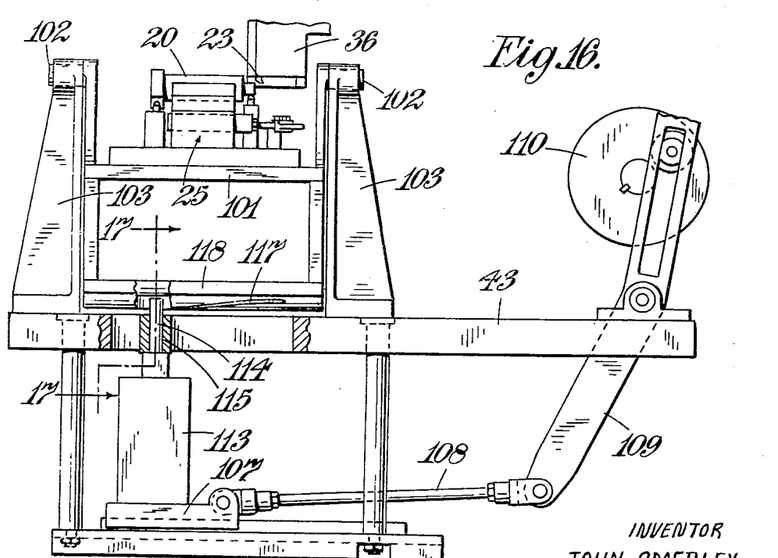
Figure 16 is a view similar to Figure 14 of another modification.

Instead of the means shown in Figures 14, 15 for rocking the table 101, the carriage 107 may carry as shown in Figure 16 a block 113 having at its upper end a pin 114 which supports a roller 115 running in guides 116 cut in the base table 43 and engages in a helical groove 117 in a part-cylindrical plate 118 carried by the table 101.

Clearly as the carriage is reciprocated the table 101 will be rocked by the pin 114 travelling along the groove 117.

It will be apreciated that the simultaneous angular adjustment of the tool 23 and the blade blank 20 permits the machining of a blade having a greater twist than can otherwise be machined.

It may be arranged that the cutting stroke takes place in the opposite direction with respect to the blank, that is, the tool cuts from the tip to the root of the blank.

I claim:

1. A method of machining an edge of a tapered blade for an axial-flow compressor or turbine, which method comprises the steps of forming the edge by effecting a cutting movement of the tool on a blade blank in a direction lengthwise of the blade blank, with the tool straddling the edge of the blade blank, and simultaneously effecting controlled relative rocking movement of the tool and blade blank about an axis which is substantially parallel to the direction of movement and passes through the point of symmetry of the tool profile, said relative rocking movement being controlled at each instant during the movement of the tool to have an angular motion dependent upon the desired outline of the section of the blade edge taken at the position of the tool at that instant.

2. A method as claimed in claim 1, wherein the thickness of the edge section of the blade decreases from root to tip to an extent such that the tool and the blade blank must be angularly adjusted through an angle $\beta$ per unit length of blade to enable the portion of the cutting profile of the tool to one side of its point of symmetry to sweep out the desired contour of the corresponding surface adjacent the edge, and wherein the edge is produced by a series of traverses of the tool with respect to the blade blank with relative rocking movement of the tool and the blade blank during each traverse and the extent of the relative rocking is varied in increments from traverse to traverse from a maximum angular adjustment during the one traverse of $\beta$ per unit length of blade in one direction from the mean position and to a maximum angular adjustment during another traverse of $\beta$ per unit length of blade in the opposite direction from the mean position.

3. A method as claimed in claim 2, wherein the blade has a twist of angle $\alpha$ per unit length, and wherein the relative rocking of the tool and blade blank is varied in increments between the limits $\alpha+\beta$ and $\alpha-\beta$ per unit length of relative traverse of the tool and blade blank.

4. Apparatus for machining an edge portion of blade blank to produce a tapered blade for an axial-flow compressor or turbine, which apparatus comprises a shaving tool having a cutting profile conforming in part to the profile of a transverse section of the desired edge portion at the root of the blade, a tool holder to support said tool to straddle the edge portion of the blade blank, a traversing slide arranged for reciprocating movement in a direction parallel to the edge of the blade blank and carrying said tool holder, means supporting said blade blank and tool for controlled relative angular movement about an axis which is substantially parallel to the direction of movement and passes through the point of symmetry of the tool profile, and means controlling said relative angular movement so as to have at each instant during movement of the tool an angular motion dependent upon the desired outline of the section of the blade edge at the position of the tool at that instant.

5. Apparatus as claimed in claim 4, wherein said controlling means comprises a radius arm projecting from the tool holder, and a sine bar engaged by the outer end of said arm whereby said arm is displaced angularly.

6. Apparatus as claimed in claim 5, comprising a bracket, one end of the sine bar being pivoted in said bracket, and said sine bar having its opposite end supported in means adjustable to vary the angle of inclination of the sine bar with respect to the direction of travel of the traversing slide.

7. Apparatus as claimed in claim 6, wherein said means to support said opposite end of the sine bar is arranged to adjust the angle of inclination of the sine bar in alternation with the reciprocation of the traversing slide.

8. Apparatus according to claim 7, wherein said means supporting the opposite end of the sine bar comprises a crank mechanism to adjust said opposite end of the sine bar and a ratchet mechanism arranged to be actuated by reciprocation of the traversing slide and arranged to rotate the crank mechanism step-by-step.

9. Apparatus as claimed in claim 4 wherein said blade blank supporting means comprises a work-holder wherein the blade blank is carried, and a swinging table whereon the work-holder is supported, said swinging table being arranged to be rocked in timed relation with the traversing movement of the traversing slide to effect in part at least the relative rocking of the tool and blade blank.

10. Apparatus as claimed in claim 9, comprising cam means arranged to rock the swinging table, said cam means including a carriage arranged for reciprocation in timed relation with the traversing slide, and cooperating cam and follower parts on said carriage and the swinging table.

11. Apparatus as claimed in claim 4, comprising also means to feed the tool and blade blank stepwise towards one another during reciprocation of the traversing slide.

12. Apparatus as claimed in claim 4, comprising also means to feed the tool and blade blank stepwise towards one another during reciprocation of the traversing slide, and means to permit the tool to partake of a working stroke in one direction of travel of the traversing slide and of an idle stroke in the opposite direction of travel of the traversing slide.

13. Apparatus for machining an edge portion of a blade bank of an axial-flow compressor or turbine blade, which apparatus comprises a work holder wherein the blade bank is carried, a shaving tool having a cutting profile conforming to the profile of a transverse section of the desired edge portion at the root of the blade, a tool holder to support said tool to straddle the edge portion of the blade blank, a traversing slide arranged for reciprocating movement in a direction parallel to the edge of the blade blank, part-cylindrical guides in said traversing slide and having their axis substantially in said edge of the blade blank and having said tool holder mounted therein for angular movement about said axis, rocking means connected with the tool holder to effect said angular movement about said axis simultaneously with the reciprocating movement of the traversing slide, a swinging table mounted to swing about the axis of said part-cylindrical guides and carrying said work-holder, and cam means adapted to rock the swinging table in timed relation with the traversing movement of the traversing slide to effect relative rocking of the tool and blade blank, said cam means comprising a carriage mounted for reciprocation in timed relation with movement of the traversing slide, a ramp carried on the carriage, a first spring-loaded sliding plunger bearing at one end on the inclined surface of the ramp and at the opposite end on the table, and a second spring-loaded plunger maintaining the table, said first spring-loaded plunger and said ramp in engagement.

14. Apparatus for machining an edge portion of a blade blank of an axial-flow compressor or turbine blade, which apparatus comprises a work holder wherein the blade blank is carried, a shaving tool having a cutting profile conforming to the profile of a transverse section of the desired edge portion at the root of the blade, a tool holder to support said tool to straddle the edge portion of the blade blank, a traversing slide arranged for reciprocating movement in a direction parallel to the edge of the blade blank, part-cylindrical guides in said traversing slide and having their axis substantially in said edge of the blade blank and having said tool holder mounted therein for angular movement about said axis, rocking means connected with the tool holder to effect said angular movement about said axis simultaneously with the reciprocating movement of the traversing slide, a swinging table mounted to swing about the axis of said part-cylindrical guides and carrying said work holder, and cam means adapted to rock the swinging table in timed relation with the traversing movement of the traversing slide to effect relative rocking of the tool and blade blank, said cam means comprising a carriage mounted for reciprocation in timed relation with movement of the traversing slide, and a pin and slot connection between the carriage and swinging table, the slot being helical, whereby on reciprocation of the carriage the pin travels in the slot and rocks the swinging table.

15. Apparatus for machining an edge portion of a blade blank of an axial-flow compressor or turbine blade, which apparatus comprises a shaving tool having a cutting profile conforming to the profile of a transverse section of the desired edge portion at the root of the blade, a tool holder to support said tool to straddle the edge portion of the blade blank, a traversing slide arranged for reciprocating movement in a direction parallel to the edge of the blade blank, part-cylindrical guides in said traversing slide and having their axis substantially in said edge of the blade blank and having said tool holder mounted therein for angular movement about said axis, rocking means connected with the tool holder to effect said angular movement about said axis simultaneously with the reciprocating movement of the traversing slide, and means to feed the tool and blade blank stepwise towards one another during reciprocation of the traversing slide comprising a guide member having the traversing slide supported slidingly thereon, wedge means to support the guide member, and means operated on reciprocation of the traversing slide to adjust the wedge means relative to the guide member and thereby feed the tool and blade blank towards one another.

16. Apparatus as claimed in claim 15, comprising a bell-crank lever arranged to displace the wedge means, and a ratchet wheel rotatable step-by-step by the reciprocation of the traversing slide and connected to the bell-crank lever to rock it in a stepwise manner.

17. Apparatus for machining an edge portion of a blade blank of an axial-flow compressor or turbine blade, which apparatus comprises a shaving tool having a cutting profile conforming to the profile of a transverse section of the desired edge portion at the root of the blade, a tool holder to support said tool to straddle the edge portion of the blade blank, a traversing slide arranged for reciprocating movement in a direction parallel to the edge of the blade blank, part-cylindrical guides in said traversing slide and having their axis substantially in said edge of the blade blank and having said tool holder mounted therein for angular movement about said axis, rocking means connected with the tool holder to effect said angular movement about said axis simultaneously with the reciprocating movement of the traversing slide, a guide member having the traversing slide supported slidingly thereon, said guide member being pivoted at one end, wedge means arranged to cooperate with said guide member to define the working position of the tool in a direction at right angles to the edge of the blade blank, means arranged on reciprocation of the traversing slide to adjust said wedge means relative to said guide member thereby to feed the tool in a direction towards said edge of the blade blank, a spring to urge said guide member to pivot out from cooperation with said wedge means, and rockable cam means arranged to be rocked in timed relation with reciprocation of said traversing slide and arranged on rocking in one direction to pivot said guide member against said spring and into cooperation with said wedge means and on rocking in the opposite direction to permit said spring to move said guide member out from cooperation with said wedge means.

References Cited in the file of this patent

UNITED STATES PATENTS

| | | |
|---|---|---|
| 1,001,908 | Venner | Aug. 29, 1911 |
| 1,379,267 | Keller | May 24, 1921 |
| 1,985,752 | Vogler | Dec. 25, 1934 |
| 2,341,194 | Schwartz et al. | Feb. 8, 1944 |
| 2,397,917 | Burrill | Apr. 9, 1946 |
| 2,534,230 | Chandler | Dec. 19, 1950 |
| 2,590,042 | Root | Mar. 18, 1952 |

FOREIGN PATENTS

| | | |
|---|---|---|
| 374 | Great Britain | Jan. 10, 1887 |
| 168,391 | Great Britain | Aug. 29, 1921 |